(12) United States Patent
Qiu

(10) Patent No.: US 11,129,415 B2
(45) Date of Patent: Sep. 28, 2021

(54) INFILTRATION DETECTING APPARATUS, ELECTRONIC CIGARETTE, AND METHOD FOR CONTROLLING ELECTRONIC CIGARETTE

(71) Applicant: CHANGZHOU JWEI INTELLIGENT TECHNOLOGY CO., LTD., Changzhou (CN)

(72) Inventor: Wei-Hua Qiu, ChangZhou (CN)

(73) Assignee: CHANGZHOU JWEI INTELLIGENT TECHNOLOGY CO., LTD., Changzhou (CN)

( * ) Notice: Subject to any disclaimer, the term of this patent is extended or adjusted under 35 U.S.C. 154(b) by 572 days.

(21) Appl. No.: 15/969,754

(22) Filed: May 2, 2018

(65) Prior Publication Data

US 2018/0249764 A1 Sep. 6, 2018

(30) Foreign Application Priority Data

Nov. 4, 2015 (CN) .......................... 201510740447.7
Nov. 4, 2015 (CN) .......................... 201510741891.0

(51) Int. Cl.
*B01F 3/04* (2006.01)
*G05D 7/06* (2006.01)
(Continued)

(52) U.S. Cl.
CPC .............. *A24F 40/44* (2020.01); *A24F 40/51* (2020.01); *A24F 40/60* (2020.01); *G01F 23/00* (2013.01);
(Continued)

(58) Field of Classification Search
CPC .......... G01N 7/00; G01N 11/00; G01F 23/00; G01M 3/16; H01L 51/5284; G05B 15/02;
(Continued)

(56) References Cited

U.S. PATENT DOCUMENTS 5,666,977 A * 9/1997 Higgins ................ A24F 47/008
128/200.14
2014/0130817 A1 * 5/2014 Li .......................... A24F 47/008
131/329
(Continued)

FOREIGN PATENT DOCUMENTS

CN 101995366 A 3/2011
CN 102901688 A 1/2013
(Continued)

*Primary Examiner* — Ramesh B Patel
(74) *Attorney, Agent, or Firm* — ScienBiziP, P.C.

(57) ABSTRACT

An infiltration detecting apparatus includes an infiltration detecting assembly and a controller. At least a part of the infiltration detecting assembly is attached or adjacent to a liquid guide, or is inserted into the liquid guide. The infiltration detecting assembly is configured to detect a related physical quantity X, and feed back the related quantity X to the controller. The controller is configured to calculate a degree of infiltration Q according to a data as to a relationship between Q and X, and compare values of Q and a first threshold value Q1. If Q<Q1, a heater is controlled not to heat. If Q≥Q1, the heater is controlled to heat. The switch shuts off or opens the electrical connection between a power module and a heater. An electronic cigarette which includes the infiltration detecting apparatus is also disclosed, together with a method of controlling an electronic cigarette.

9 Claims, 3 Drawing Sheets

(51) Int. Cl.
*G01N 33/00* (2006.01)
*A24F 47/00* (2020.01)
*H04L 29/08* (2006.01)
*A24F 40/44* (2020.01)
*H01L 51/52* (2006.01)
*G01M 3/16* (2006.01)
*A24F 40/51* (2020.01)
*G01F 23/00* (2006.01)
*A24F 40/60* (2020.01)
*G01N 7/00* (2006.01)
*G05B 15/02* (2006.01)
*G01N 11/00* (2006.01)
*A24F 40/10* (2020.01)

(52) U.S. Cl.
CPC ............... *G01M 3/16* (2013.01); *G01N 7/00* (2013.01); *G05B 15/02* (2013.01); *H01L 51/5284* (2013.01); *A24F 40/10* (2020.01); *G01N 11/00* (2013.01); *G05B 2219/2639* (2013.01)

(58) Field of Classification Search
CPC .. G05B 2219/2639; A24F 40/44; A24F 40/10; A24F 40/60; A24F 40/51; A24F 47/00
See application file for complete search history.

(56) References Cited

U.S. PATENT DOCUMENTS

| | | | | |
|---|---|---|---|---|
| 2016/0157523 | A1* | 6/2016 | Liu | A24F 40/42 392/395 |
| 2016/0309784 | A1* | 10/2016 | Silvestrini | A24F 47/008 |
| 2016/0361678 | A1* | 12/2016 | Blackley | A24F 40/48 |
| 2017/0280779 | A1* | 10/2017 | Qiu | G05D 23/1919 |
| 2018/0325179 | A1* | 11/2018 | Li | A24F 40/465 |
| 2019/0246699 | A1* | 8/2019 | Qiu | G05D 23/2401 |

FOREIGN PATENT DOCUMENTS

| | | |
|---|---|---|
| CN | 102920028 A | 2/2013 |
| CN | 204599332 U | 9/2015 |
| CN | 105212280 A | 1/2016 |
| CN | 105595430 A | 5/2016 |
| TW | 201509316 A | 3/2015 |

\* cited by examiner

INFILTRATION DETECTING APPARATUS, ELECTRONIC CIGARETTE, AND METHOD FOR CONTROLLING ELECTRONIC CIGARETTE

FIELD

The present disclosure relates to an electronic cigarette, and more particularly to an infiltration detecting apparatus, an electronic cigarette, and control method of the electronic cigarette.

BACKGROUND

A battery of an electronic cigarette supplies power to a heater of the electronic cigarette, and the heater heats the liquid tobacco in a liquid guide to generate smoke. Thus, a user can acquire a smoking experience.

However, the liquid guide is usually made of cotton or fiber. If the liquid guide is not saturated enough with the liquid tobacco, the heater will burn the cotton or fiber, which results in a scorched smell and adversely affects the taste of the smoke. When a user uses a new atomizing head, the cotton or fiber is easily burnt due to the liquid guide being not saturated enough with the liquid tobacco. On the other hand, if the liquid guide is over saturated with the liquid tobacco and the liquid tobacco is not timely consumed, there is a risk of leaking liquid tobacco.

Thus, there is room for improvement within the art.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

In order to make the above-mentioned objects, features, and advantages of the present application more obvious, a description of specific embodiments of the present application will be described with reference to the accompanying drawings. The present application can be implemented in many ways different from those described herein, and those skilled in the art can make similar improvements without violating the contents of the present application. Therefore, the present application is not to be considered as limiting the scope of the embodiments to those described herein.

Several definitions that apply throughout this disclosure will now be presented.

Unless otherwise defined, all technical and scientific terms used herein have the same meaning as commonly understood by one skilled in the art. The terms used in a specification of the present application herein are only for describing specific embodiments, and are not intended to limit the present application.

Figure 1:
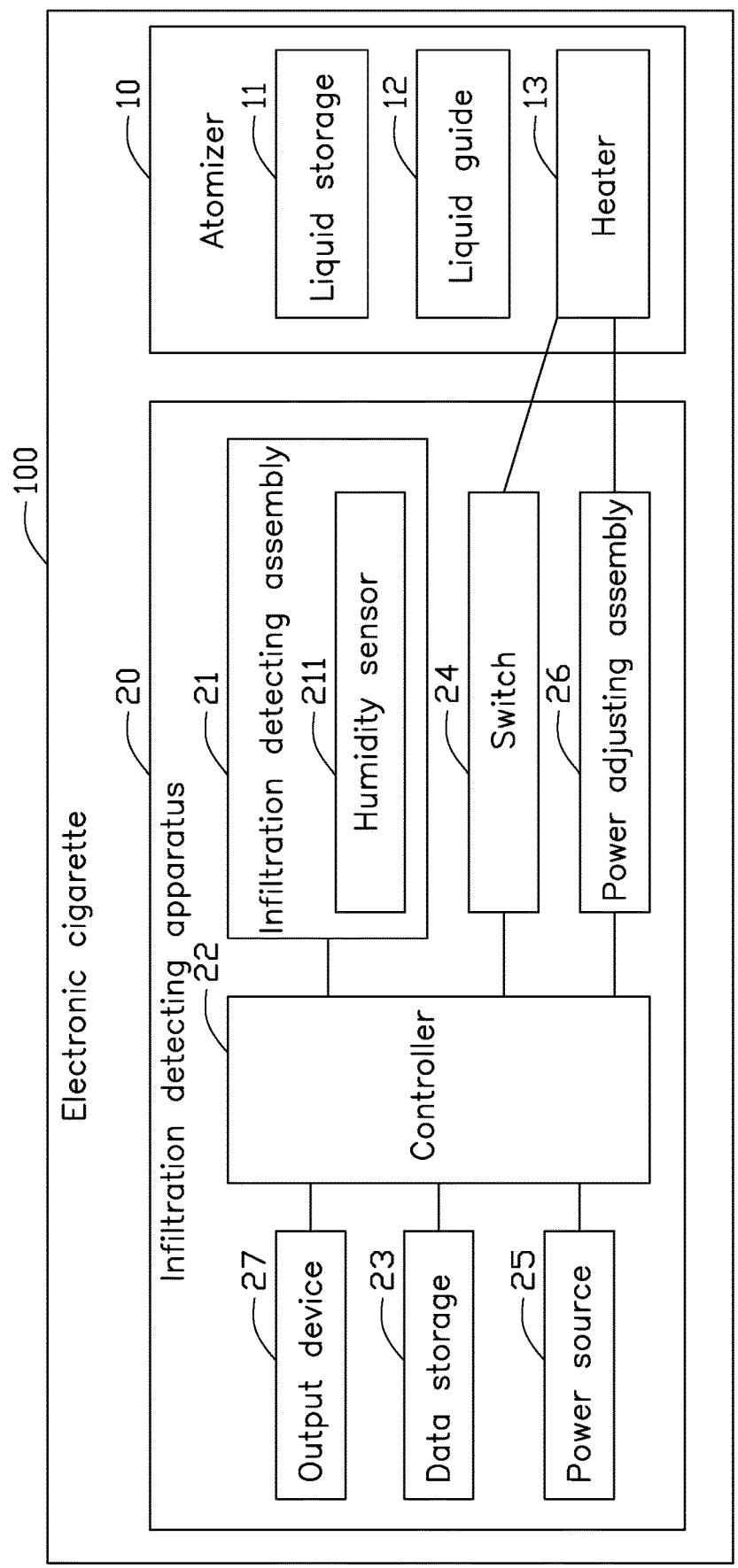
FIG. 1 is a block diagram of an electronic cigarette.

FIG. 1 shows a block diagram of an electronic cigarette 100. Any component which is not related to the principles of the disclosure is omitted to simplify the figures.

The electronic cigarette 100 includes an atomizer 10 and a battery assembly 20. The atomizer 10 is electrically connected to the battery assembly 20. The battery assembly 20 is configured to supply power for the atomizer 10. The atomizer 10 is electrically driven and configured to heat liquid tobacco to generate smoke, so a user acquires a smoking experience.

The atomizer 10 includes a liquid storage 11, a liquid guide 12, and a heater 13.

The liquid storage 11 is configured to store the liquid tobacco.

At least a part of the liquid guide 12 is contacting the liquid storage 11, and at least a part of the liquid guide 12 is contacting the heater 13. The liquid guide 12 is configured to transfer the liquid tobacco from the liquid storage 11 to the heater 13.

The heater 13 is electrically driven and configured to heat the liquid tobacco to generate smoke.

In other embodiments, the liquid guide 12 and the heater 13 can be combined as one element. The combined element has functions of guiding liquid and heating the liquid.

The embodiment of the present disclosure further provides an infiltration detecting apparatus. The apparatus can be all or part of the atomizer 10, or all or part of the battery assembly 20. The following is an embodiment of the infiltration detecting apparatus being the battery assembly 20.

The infiltration detecting apparatus 20 includes an infiltration detecting assembly 21, a controller 22, a data storage 23, a switch 24, and a power source 25. At least a part of the infiltration detecting assembly 21 is adjacent to or attached to the liquid guide 12. In other embodiments, at least a part of the infiltration detecting assembly 21 can be inserted into the inside of the liquid guide 12. The infiltration detecting assembly 21, the data storage 23, the switch 24, and the power source 25 are electrically connected with the controller 22. The switch 24 is further electrically connected with the heater 13.

An infiltration degree Q represents the degree to which the liquid guide 12 is infiltrated with liquid tobacco. A related physical quantity X has a relationship with the infiltration degree Q. The infiltration detecting assembly 21 is configured to detect the related physical quantity X, and feed back the related physical quantity X to the controller 22. When the liquid guide 12 is infiltrated with liquid tobacco, physical quantities of humidity, gravity, and resistance of the liquid guide 12 are changed accordingly. The infiltration degree Q of the liquid guide 12 has relationships with physical quantities of humidity, gravity, and resistance of the liquid guide 12. Therefore, the related physical quantity may include at least one of humidity, gravity, and resistance. In the illustrated embodiment of the electronic cigarette 100 shown in FIG. 1, the related physical quantity X is the humidity in the liquid guide 12. The infiltration detecting assembly 21 includes a humidity sensor 211. The humidity sensor 211 is configured to detect the humidity in the liquid guide 12. The infiltration detecting assembly 21 can detect the related physical quantity X in real-time when the electronic cigarette 100 is started up.

The controller 22 is configured to calculate the infiltration degree Q according to relationship of the infiltration degree Q and the related physical quantity X, and compare the values of the infiltration degree Q and a first threshold value Q1. When Q<Q1, the heater 13 is not controlled to heat. When Q≥Q1, the heater is controlled to heat.

The data storage 23 is configured to store data. The data includes data as to relationship between the infiltration degree Q, the related physical quantity X, and the first threshold value Q1. The first threshold value Q1 represents the minimum degree of infiltration of the liquid guide 12 with liquid tobacco when the heater 13 is working. When Q≥Q1, the cotton or fiber of the liquid guide 12 will not be burnt.

The power source 25 is configured to supply power for all elements of the electronic cigarette 100.

Furthermore, the data storage 23 is configured to store a second threshold value Q2. The second threshold value Q2 represents the maximum degree of infiltration of the liquid guide 12 with liquid tobacco when the heater 13 is working. When Q>Q2, the electronic cigarette 100 has a risk of leaking liquid tobacco. Therefore, the controller 22 is further configured to compare the values of infiltration degree Q and the second threshold value Q2. When Q>Q2, the controller 22 controls the heater 13 not to heat.

The method of that controller 22 controls the heater 13 not to heat includes: if the heater 13 does not heat, the controller 22 does not need to perform any operation; otherwise, if the heater 13 is heating, the controller 22 sends a standby instruction to the switch 24, and the switch 24 shuts off an electrical connection between the power source 25 and the heater 13. Similarly, the method of that controller 22 controls the heater 13 to heat includes: if the heater 13 does not heat, the controller 22 sends a startup instruction to the switch 24, and the switch 24 recovers the electrical connection between the heater 13 and the power source 25; otherwise, if the heater 13 is heating, the controller 22 does not need to perform any operation.

Furthermore, the infiltration detecting apparatus 20 includes a power adjusting assembly 26. The power adjusting assembly 26 is electrically connected with the controller 22 and the heater 13. The power adjusting assembly 26 is configured to adjust the output power of the power source 25 for the heater 13 according to an instruction. The adjusting instruction is sent by the controller 22. Therefore, the heat output of the heater 13 can be adjusted. Before the heater 13 starts heating, the function of the power adjusting assembly 26 is locked. When the heater 13 starts working, the function of the power adjusting assembly 26 is unlocked.

Furthermore, according to the value of infiltration degree Q, the controller 22 sends out power adjusting instruction to adjust the power of the electronic cigarette 100 automatically. When the value of infiltration degree Q is small, the output power becomes small. When the value of the infiltration degree Q is large, the output power becomes large. This helps to maintain consistency of the taste of smoke. One power adjusting instruction can correspond to one value of the infiltration degree Q or to numerical intervals of the infiltration degree Q.

Furthermore, the data storage 23 is configured to store a third threshold value Q3, and Q1<Q3<Q2. The third threshold value Q3 divides into two the range of infiltration degree for the heater 13 to work. The division includes one side a low degree of infiltration interval and on the other side a high degree of infiltration interval. The low degree of infiltration interval is where Q1≤Q<Q3. The high degree of infiltration interval is where Q3≤Q≤Q2. The controller 23 is further configured to compare values of infiltration degree Q and the third threshold value. When Q1≤Q<Q3, the controller 22 sends a low output power instruction to the power adjusting assembly 26. When Q3≤Q≤Q2, the controller 22 sends a high output power instruction to the power adjusting assembly 26. When the low output power instruction is received, the power adjusting assembly 26 adjusts the output power of the power source 25 for the heater 13, to enable the heater 13 to work in a low output power (PL) condition. When the high output power instruction is received, the power adjusting assembly 26 adjusts the output power of the power source 25 for the heater 13, to enable the heater 13 to work in a high output power (PH) condition.

Furthermore, the infiltration detecting apparatus 20 includes an output device 27. The output device 27 is electrically connected with the controller 22. The output device 27 is configured to output indication message for indicating a user according to instructions from the controller 22. The indication message may include at least one of voice, picture, text, light, and vibration. The output device 27 may include at least one of voice prompting module, screen displaying module, light prompting module, and vibration module.

Furthermore, when Q<Q1, the controller 22 sends a potential burn warning instruction to the output device 27. When the output device 27 receives the potential burn warning instruction, a potential burn warning message is output to the user. When Q>Q2, the controller 22 sends a leak-risk instruction to the output device 27. When the output device 27 receives the leak-risk instruction, a leak-risk warning message is an output to the user.

In other embodiments, the infiltration detecting assembly 21 can be a part of the atomizer 10.

In the illustrated embodiment, values of Q1, Q2, and Q3 are stored in the data storage, and data as to relationship between Q and X is also stored in the data storage 23. In other embodiments, the values and data mentioned above can be stored in a cloud or other device. When the values and data are needed, they can be got from the cloud or other device.

In the illustrated embodiment, the infiltration detecting apparatus acts as the battery assembly. In other embodiments, if the infiltration detecting apparatus does not act as the battery assembly, the infiltration detecting apparatus may not include the power source. Additionally, every part of the infiltration detecting apparatus can be positioned in different assemblies. For example, the infiltration detecting assembly 21 can be positioned in an atomizing assembly, the controller 22 can be positioned in the battery assembly. Of course, the parts of the infiltration detecting apparatus can also be positioned in one assembly, and according to the differences of assemblies, the infiltration detecting apparatus can include more components or fewer components.

Figure 2:
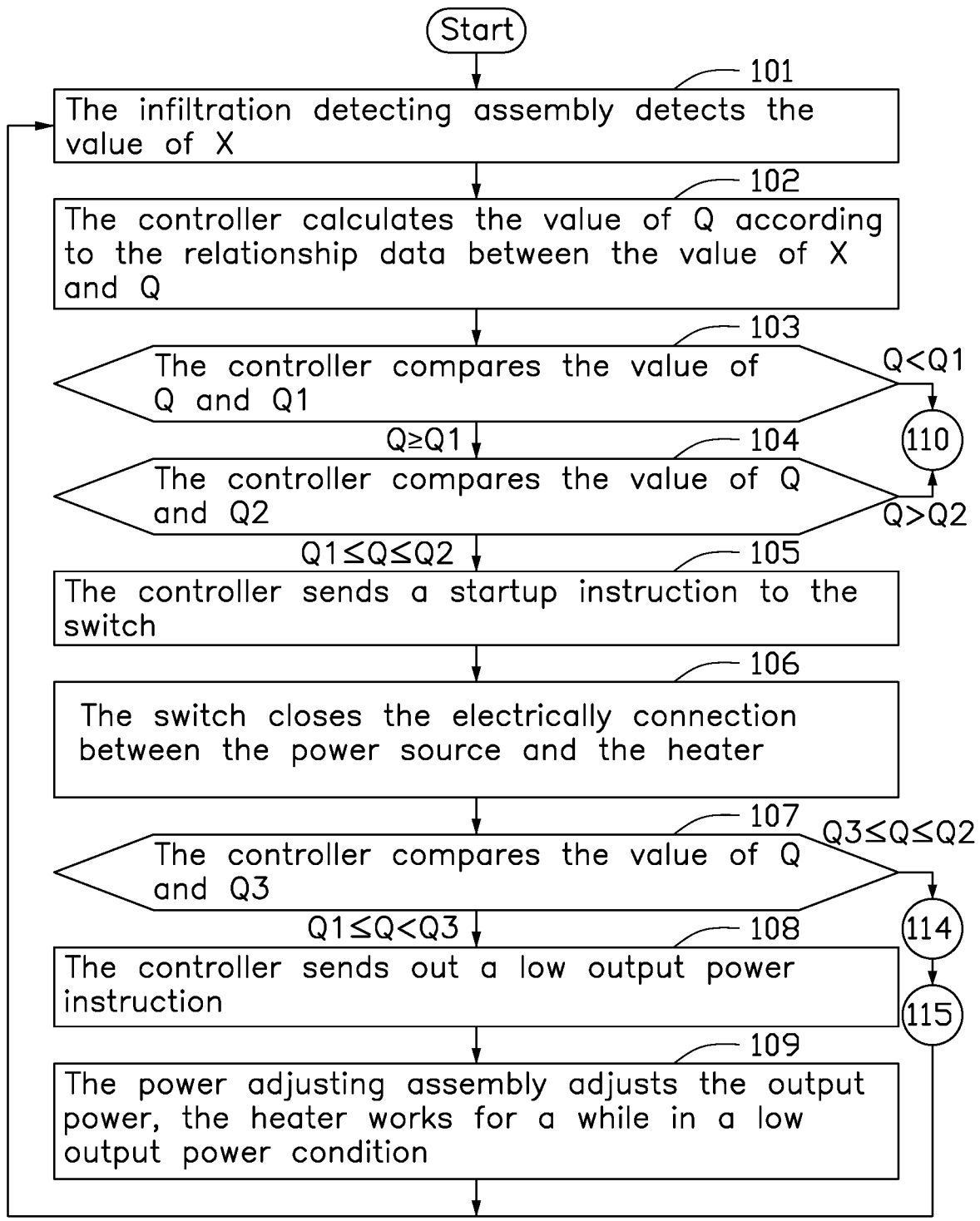
FIG. 2 is a flowchart of a control method of the electronic cigarette.
Figure 3:
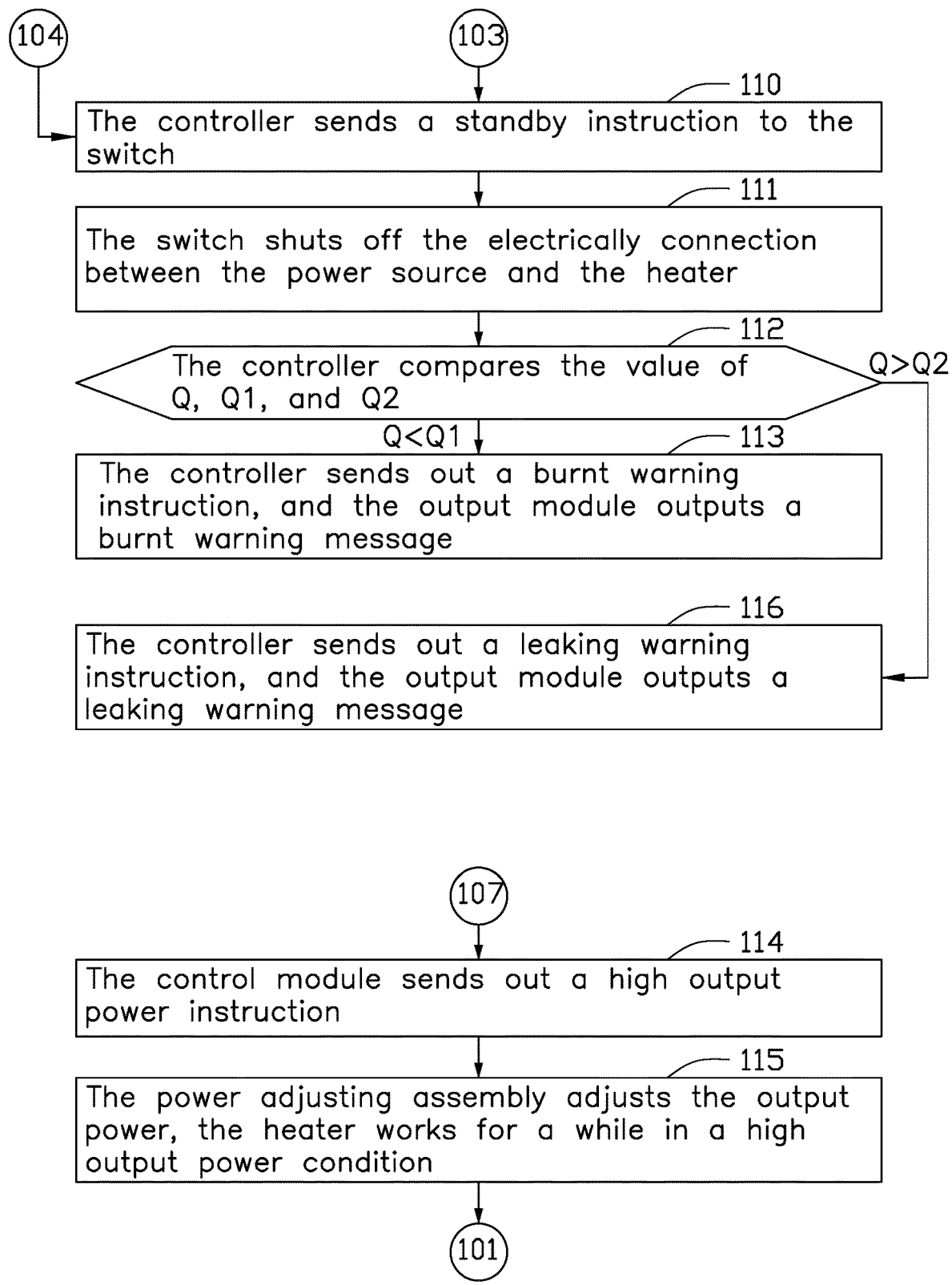
FIG. 3 is a flowchart of the control method shown in FIG. 2.

FIG. 2 and FIG. 3 show steps of a control method of the electronic cigarette 100.

In step S101, the infiltration detecting assembly 21 detects the related physical quantity X corresponding to the degree of infiltration Q, in which Q represents the degree to which the liquid guide 12 is infiltrated with liquid tobacco. The related physical quantity X is fed back to the controller 22. Then, the method continues to step S102.

In step S102, the controller 22 calculates the degree of infiltration Q according to the relationship between X and Q, the data as to relationship being pre-stored in the data storage 23. Then, the method continues to step S103.

In step S103, the controller 22 compares values of the infiltration degree Q and the first threshold value Q1. If Q>Q1, the method continues to step S104. If Q<Q1, the method continues to step S110.

In step S104, the controller 22 compares the values of infiltration degree Q and the second threshold value Q2. If Q1≤Q≤Q2, the method continues to step S105. If Q>Q2, the method continues to step S110.

In step S105, the controller 22 sends a startup instruction to the switch 24. Then, the method continues to step S106.

In step S106, the switch 24 closes the electrical connection between the power source 25 and the heater 13. Then, the method continues to step S107.

In step S107, the controller 22 compares the values of the infiltration degree Q and the third threshold value Q3. If $Q1 \leq Q \leq Q3$, the method continues to step S108. If $Q3 \leq Q \leq Q2$, the method continues to step S114.

In step S108, the controller 22 sends a low output power instruction to the power adjusting assembly 26. Then, the method continues to step S109.

In step S109, the power adjusting assembly 26 adjusts the output power of the power source 25 for the heater 13, thus the heater 13 instantly works for a certain time in the low output power (PL) condition. Then, the method continues to step S101.

In step S110, the controller 22 sends a standby instruction to the switch 24. Then, the method continues to step S111.

In step S111, the switch 24 shuts off the electrical connection between the power source 25 and the heater 13. Then, the method continues to step S112.

In step S112, the controller 22 compares the values of infiltration degree Q, the first threshold value Q1, and the second threshold value Q2. If $Q<Q1$, the method continues to step S113. If $Q>Q2$, the method continues to step S116.

In step S113, the controller 22 sends a potential burn warning instruction to the output device 27. The output device 27 outputs a potential burn warning message to the user accordingly.

In step S114, the controller 22 sends a high output power instruction to the power adjusting assembly 26. Then, the method continues to step S115.

In step S115, the power adjusting assembly 26 adjusts the output power of the power source 25 for the heater 13, thus the heater 13 instantly works for a certain time in a high output power (PH) condition. Then, the method continues to step S101.

In step S116, the controller 22 sends a leak-risk warning instruction to the output device 27. The output device 27 outputs a leak-risk warning message to the user accordingly.

In the illustrated embodiment, the controller 22 controls the heater 13 to heat or not through the startup instruction and the standby instruction. In practical application, the controller 22 can also do nothing. The control method is already described, and need not be rehashed here.

The present disclosure provides following advantages:

First, by detecting the related physical quantity X and calculating the infiltration degree Q according to the relationship, the user knows the degree to which the liquid guide 12 is infiltrated with liquid tobacco.

Second, burning of the liquid guide 12 can be prevented by shutting off the electrical connection between heater 13 and the power source 25 when $Q<Q1$.

Third, when $Q>Q2$, the electrical connection between the heater 13 and the power source 25 is shut off, thus the user will know that the electronic cigarette 100 has a risk of leaking, and the electrical circuitry is protected against contamination.

Fourth, if the infiltration degree Q is in the range within which the heater 13 can work, the output power can be adjusted automatically according to the value of infiltration degree Q, thus the taste of smoke is better.

Even though information and advantages of the present embodiments have been set forth in the foregoing description, together with details of the structures and functions of the present embodiments, the disclosure is illustrative only.

Changes may be made in detail, especially in matters of shape, size, and arrangement of parts within the principles of the present embodiments to the full extent indicated by the plain meaning of the terms in which the appended claims are expressed.

What is claimed is:

1. A infiltration detecting apparatus comprising:
   an infiltration detecting assembly, at least a part of the infiltration detecting assembly being inserted into the inside of the liquid guide, the infiltration detecting assembly being configured to detect a related physical quantity X in the liquid guide, the related physical quantity X corresponding to an infiltration degree Q, the infiltration degree Q representing the degree to which the liquid guide is infiltrated with liquid tobacco;
   a controller, electrically connected to the infiltration detecting assembly, the infiltration detecting assembly configured to feed back the related physical quantity X to the controller;
   a data storage, electrically connected to the controller, the data storage configured to store data, the data comprises a first threshold value Q1, a second threshold value Q2, a third threshold value Q3, and data as to a relationship between the related physical quantity X and the infiltration degree Q, wherein $Q1<Q3<Q2$;
   the controller configured to acquire data stored in the data storage, and to calculate the infiltration degree Q according to the detected related physical quantity X and the relationship data;
   the controller is further electrically connected to a heater, and the controller is configured to compare values of Q and the first threshold value Q1, if $Q<Q1$, the heater is controlled not to heat, if $Q \geq Q1$, the heater is controlled to heat the first threshold value Q1 representing the minimum degree of infiltration of the liquid guide with liquid tobacco when the heater is working;
   when $Q1 \leq Q<Q3$, the controller adjusts power output of a power source for the heater, the heater accordingly working in a low output power condition, when $Q3 \leq Q \leq Q2$, the controller adjusts the power output of the power source for the heater, the heater accordingly working in a high output power condition, the second threshold value Q2 configured to represent the maximum degree to which the liquid guide is permitted to be infiltrated with liquid tobacco.

2. The infiltration detecting apparatus as claimed in claim 1, wherein the controller is further configured to compare values of infiltration degree Q and the second threshold value Q2, and if $Q>Q2$, the controller sends a standby instruction to a switch.

3. The infiltration detecting apparatus as claimed in claim 1, wherein the infiltration detecting apparatus further comprises a power adjusting assembly, the power adjusting assembly is configured to adjust the output power of the power source for the heater according to a power adjusting instruction sent by the controller, thus the heater works in an adjusted output power.

4. The infiltration detecting apparatus as claimed in claim 3, wherein the controller sends out power adjusting instructions according to values of the infiltration degree Q, one value of the degree of infiltration Q corresponds to one power adjusting instruction, or one value interval of the degree of infiltration Q corresponds to one power adjusting instruction.

5. The infiltration detecting apparatus as claimed in claim 4, wherein, when $Q1 \leq Q<Q3$, the controller sends a low output power instruction to the power adjusting assembly, when $Q3 \leq Q \leq Q2$, the controller sends a high output power instruction to the power adjusting assembly, when the low output power instruction is received, the power adjusting assembly adjusts the output power of the power source for the heater, so that the heater works in the low output power condition, when the high output power instruction is received, the power adjusting assembly adjusts the output power of the power source for the heater, so that the heater works in the high output power condition.

6. The infiltration detecting apparatus as claimed in claim 1, wherein the infiltration detecting apparatus further comprises an output device, the output device is configured to output indicating messages according to instructions from the controller, the indicating messages are configured to warn users of certain potential risks.

7. The infiltration detecting apparatus as claimed in claim 6, wherein when $Q<Q1$, the controller sends a potential burn warning instruction to the output device, the output device outputs a potential burn warning message to user after receiving the potential burn warning instruction, when $Q>Q2$, the controller sends a leak-risk warning instruction to the output device, the output device outputs a leak-risk warning message to user after receiving the leak-risk warning instruction.

8. The infiltration detecting apparatus as claimed in claim 1, wherein the related physical quantity X comprises at least one of humidity, gravity, and resistance of the liquid guide.

9. The infiltration detecting apparatus as claimed in claim 8, wherein, the related physical quantity X is a humidity in the liquid guide, the infiltration detecting assembly comprises a humidity sensor, the humidity sensor is configured to detect the humidity in the liquid guide.

\* \* \* \* \*